United States Patent
Zhang et al.

(10) Patent No.: US 8,941,870 B2
(45) Date of Patent: Jan. 27, 2015

(54) AUTOMATED FILE GENERATION USING A MULTIFUNCTION PERIPHERAL

(71) Applicant: Toshiba Tec Kabushiki Kaisha, Shinagawa-ku, Tokyo (JP)

(72) Inventors: Jia Zhang, Irvine, CA (US); William Su, Riverside, CA (US)

(73) Assignee: Toshiba Tec Kabushiki Kaisha, Tokyo (JP)

(*) Notice: Subject to any disclaimer, the term of this patent is extended or adjusted under 35 U.S.C. 154(b) by 25 days.

(21) Appl. No.: 13/754,576

(22) Filed: Jan. 30, 2013

(65) Prior Publication Data

US 2013/0201508 A1  Aug. 8, 2013

Related U.S. Application Data

(60) Provisional application No. 61/596,336, filed on Feb. 8, 2012.

(51) Int. Cl.
*G06F 3/12* (2006.01)
*H04N 1/00* (2006.01)
*G06F 17/22* (2006.01)
*G06F 17/24* (2006.01)

(52) U.S. Cl.
CPC ......... *H04N 1/0083* (2013.01); *H04N 1/00204* (2013.01); *H04N 1/00408* (2013.01); *G06F 17/2247* (2013.01); *G06F 17/248* (2013.01); *H04N 2201/0039* (2013.01); *H04N 2201/0094* (2013.01)
USPC ...................................... 358/1.15

(58) Field of Classification Search
CPC .................................................. G06F 17/248
USPC ............................................................ 358/1.15
See application file for complete search history.

(56) References Cited

U.S. PATENT DOCUMENTS

| | | | |
|---|---|---|---|
| 7,810,031 B2 | 10/2010 | Coleman et al. | |
| 7,988,051 B2 | 8/2011 | Alleshouse | |
| 2002/0163653 A1* | 11/2002 | Struble et al. | 358/1.2 |
| 2004/0015782 A1 | 1/2004 | Day et al. | |
| 2005/0262049 A1 | 11/2005 | Somppi | |
| 2008/0068647 A1* | 3/2008 | Isobe et al. | 358/1.15 |
| 2009/0237712 A1* | 9/2009 | Shirai | 358/1.15 |
| 2010/0005115 A1 | 1/2010 | Richter et al. | |
| 2010/0245877 A1* | 9/2010 | Wei et al. | 358/1.13 |
| 2010/0271659 A1* | 10/2010 | Kawajiri | 358/1.15 |

* cited by examiner

*Primary Examiner* — Eric A Rust
(74) *Attorney, Agent, or Firm* — SoCal IP Law Group LLP; Steven C. Sereboff; Jonathan Pearce (57) ABSTRACT

There is disclosed multifunction peripheral and a method for automated file generation. The multifunction peripheral includes a network interface for accessing a data source including data to be inserted into a plurality of files generated using a template and the data source and for sending the plurality of files to the output destination. The multifunction peripheral also includes a user interface for receiving identification of template elements within an electronic document and for receiving selection of an output destination for the plurality of files generated using the template and the data source. The multifunction peripheral also includes a controller for generating the template from the electronic document using the identified template elements, for generating a preview of a file generated using the template and the data source, the preview visible on the display device and for generating the plurality of files using the template and the data source.

22 Claims, 6 Drawing Sheets

© Toshiba Tec Kabushiki Kaisha

AUTOMATED FILE GENERATION USING A MULTIFUNCTION PERIPHERAL

RELATED APPLICATION INFORMATION

This patent claims priority from U.S. Patent Application No. 61/596,336 entitled "System and Method to Automate File Generation for MFP Through Connector" filed Feb. 8, 2012.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to automated file generation using a multifunction peripheral.

2. Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as a document, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's networks which also include various other workstations, servers and peripherals. An MFP may also provide remote document processing services to external or network devices.

The creation of documents from a template using a database has typically been accomplished using a computer, a template file and a data repository, such as a database, for filling in the "blanks" in the template file and, thereby, generating a series of files including data from the data repository. The process of creating the template and of obtaining the data is typically unwieldy. In preparing documents to be printed and mailed, multiple steps involving the data, the computer, the template and the printer are required.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
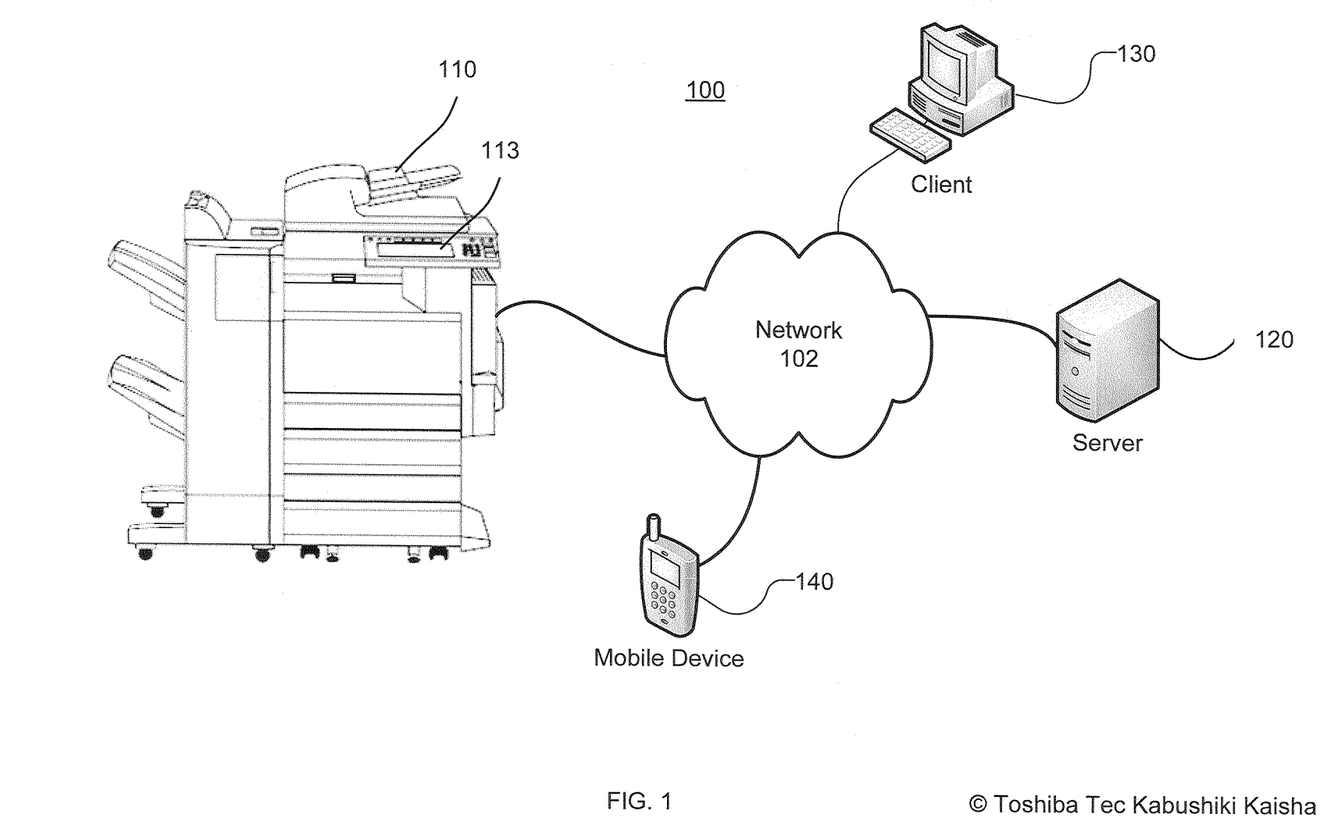
FIG. 1 is a diagram of an MFP system.

Referring now to FIG. 1 there is shown an MFP system 100. The system 100 includes an MFP 110, a server 120, a client computer 130, and a mobile device 140, all interconnected by a network 102. The system 100 may be implemented in a distributed computing environment and interconnected by the network 102.

The network 102 may be a local area network, a wide area network, a personal area network, the Internet, an intranet, or any combination of these. The network 102 may have physical layers and transport layers according to IEEE 802.11, Ethernet or other wireless or wire-based communication standards and protocols such as WiMax®, Bluetooth®, the public switched telephone network, a proprietary communications network, infrared, and optical.

The MFP 110 may be equipped to receive portable storage media such as USB drives. The MFP 110 includes a user interface subsystem 113 which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alpha-numeric keypad and/or an associated thin client through which a user may interact directly with the MFP 110.

The server 120 is a server computer running software and connected to the network. The client computer 130 may be a PC, thin client or other device. The server 120 may be or include a database, an Exchange® (or other mail server), a cloud-based storage solution. The server 120 may be implemented as a group of servers performing one or more functions together or in network communication with one another.

The client computer 130 is representative of one or more end-user devices. The mobile device 140 may be a smart phone, tablet computer, mobile phone, or other portable computing device.

Figure 2:
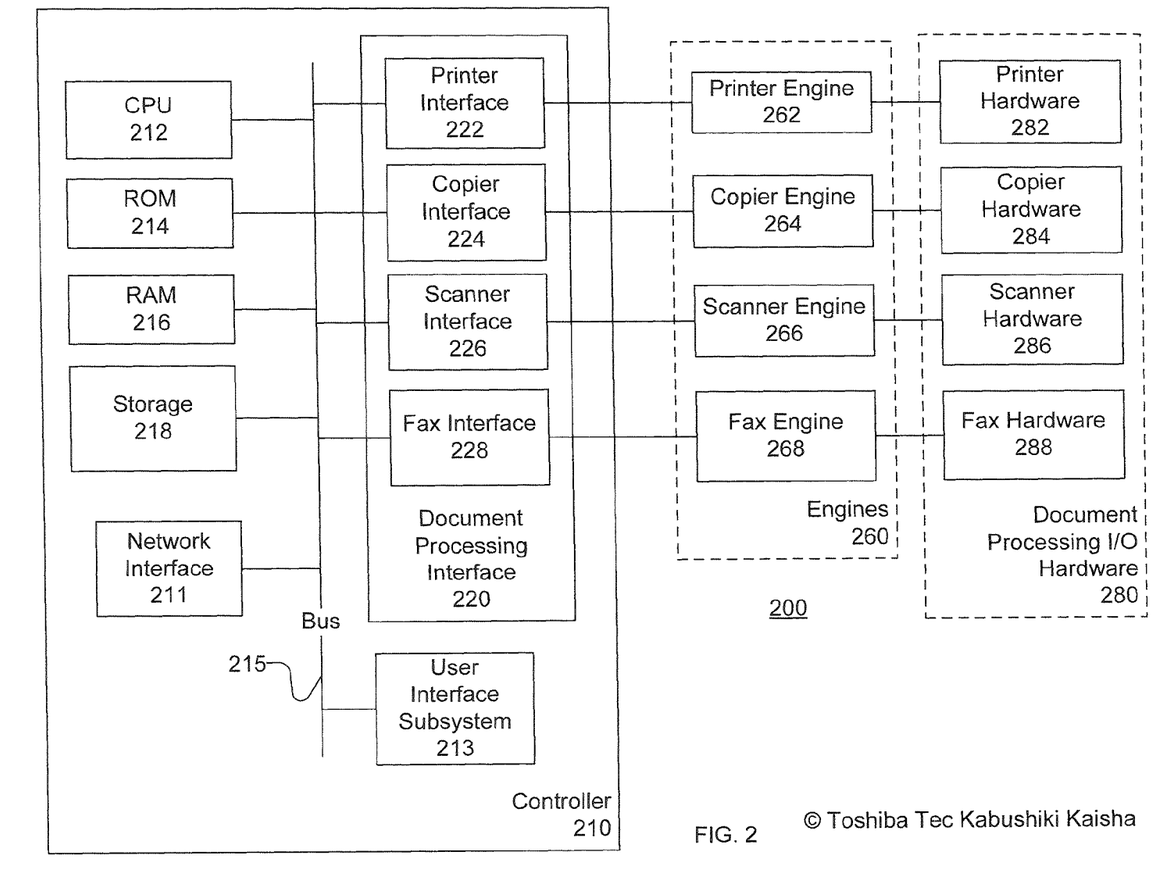
FIG. 2 is a block diagram of an MFP.

Turning now to FIG. 2 there is shown a block diagram of an MFP 200 which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state storage. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 allowing the MFP 200 to communicate with other devices.

The bus 215 enables data communication between devices and systems within the MFP 200. The bus 215 may conform to the PCI, PCI Express, or another bus standard.

The MFP 200 may operate substantially autonomously. However, the MFP 200 may be controlled from and provide output to the user interface subsystem 213, such as the user interface subsystem 113 in FIG. 1.

The document processing interface 220 may be capable of handling multiple types of document processing operations and therefore may incorporate a plurality of interfaces, such as the printer interface 222, the copier interface 224, the scanner interface 226 and the fax interface 228. The printer interface 222, copier interface 224, scanner interface 226, and fax interface 228 are examples of document processing interfaces. The printer interface 222, copier interface 224, scanner interface 226 and fax interface 228 may include software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions. These engines may include software, firmware, hardware or a combination thereof that enable the document processing interface 220 to communicate with the document processing I/O hardware 280.

Figure 3:
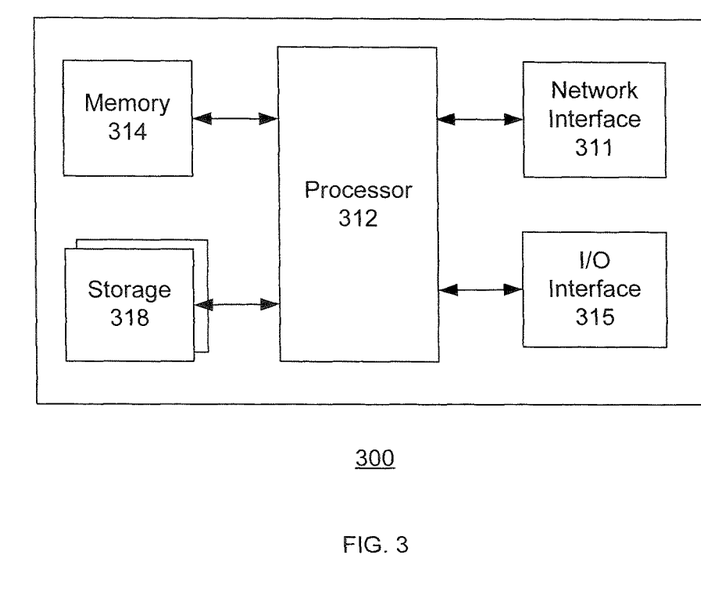
FIG. 3 is a block diagram of a computing device.

Turning now to FIG. 3 there is shown a computing device 300, which is representative of the server computers, client computers and other computing devices discussed herein. The controller 210 may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, field programmable gate arrays (FPGAs), application specific integrated circuits (ASICs), programmable logic devices (PLDs) and programmable logic arrays (PLAs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

As used herein, the term storage medium corresponds to the storage 318 and does not include transitory media such as signals or waveforms.

The network interface 311 includes an interface to a network such as network 102.

The I/O interface 315 interfaces the processor 312 to peripherals (not shown) such as displays, keyboards and USB devices.

Figure 4:
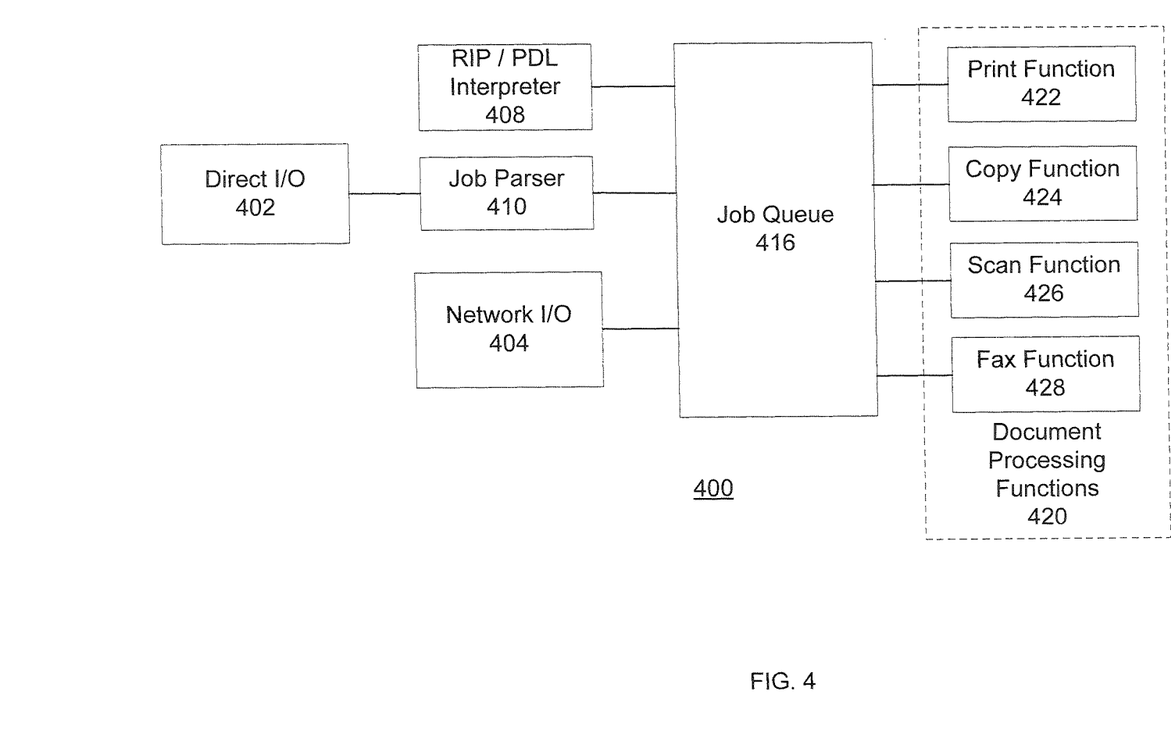
FIG. 4 is a block diagram of a software system for an MFP.

Turning now to FIG. 4 there is shown a block diagram of a software system 400 of an MFP which may operate on the controller 210 (FIG. 2). The system 400 includes direct I/O 402, network I/O 404, a RIP/PDL interpreter 408, a job parser 410, a job queue 416, a series of document processing functions 420 including a print function 422, a copy function 424, a scan function 426 and a fax function 428.

The direct I/O 402 and the network I/O 404 provide input and output to the MFP controller. The direct I/O 402 is for the user interface on the MFP (e.g., user interface subsystem 113), and the network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail, TELNET, or other network communication protocols. The direct I/O 402 and/or the network I/O 404 may include or interact to include near field communications (NFC) capabilities.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the direct I/O 402. The direct I/O 402 may include printing, fax transmission or other input of a document for handling by the system 400.

The print function 422 enables the MFP to print documents and implements each of the various functions related to that process using the printer interface 222. These include stapling, collating, hole punching, and similar functions. The copy function 424 enables the MFP to perform copy operations and all related functions such as multiple copies, collating, 2 to 1 page copying or 1 to 2 page copying and similar functions using the copier interface 224. Similarly, the scan function 426 enables the MFP to scan and to perform all related functions such as shrinking scanned documents, storing the documents on a network or emailing those documents to an email address using the scanner interface 226. The fax function 428 enables the MFP to perform facsimile operations and all related functions such as multiple number fax or auto-redial or network-enabled facsimile using the fax interface 228.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

Description of Processes

Figure 5:
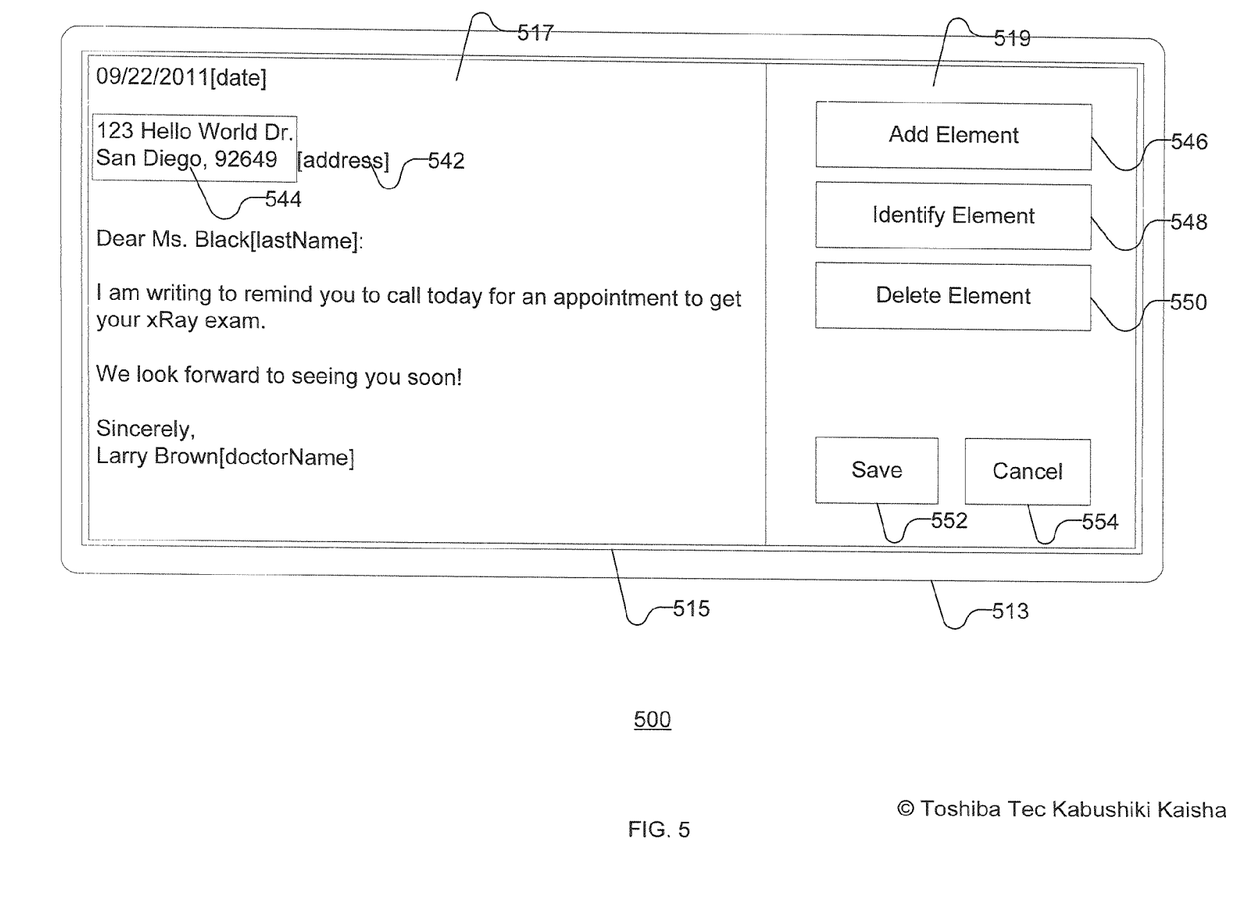
FIG. 5 is a closer view of an example display of a user interface subsystem of an MFP

Referring now to FIG. 5, a closer view of an example display 515 of a user interface subsystem 513 of an MFP 500 is shown. The display 515 includes a touchscreen such that a user may interact with images displayed on the display 515. The display 515 shows the text 517 of a document that has been scanned by a user using the MFP and a user interface 519.

The text 517 is a form letter including a number of template elements. The address 542 is one example of a template element. The user may interact with the display to select a portion of the text 517 that is to become a template element. The portion of the text 517 that becomes a template element will become a "blank" in the template that will be replaced with data from a data source. The "[address]" tag appended to the end of that portion of the text is intended to identify the template element during the template creation process. The highlighted portion of text 544 is text that acts as a placeholder for the template element 542 in this display 515.

The user may interact with the text 517 on the display 515 to thereby identify a number of template elements that will act as placeholders for data from a data source. This interaction may take the form of user touch interaction or the user of a cursor and related movement keys on a keypad near the display 515. The interactive selection may be adaptive such that it is capable of recognizing typical text portions such as addresses (typically taking up two or more lines) or last names (typically following a "Mr.", "Mrs.", "Dr." or the like). The interactive selection may involve two touchscreen touches at the same time such that the beginning and the end of a portion of the text 517 may be identified simultaneously. Alternatively, the selection may be iterative such that the beginning point of a selection takes place, then the end point may be selected.

The identification process begins when a document is scanned by an MFP and optical character recognition (OCR) is performed on the document. In this way, the text 517 of the document may appear on the display 515. Next, a user may wish to add a template element using the add element button 546. The element may be added at a default location, which may be predefined by the user, or may be added at a location in the text 517 where the user has most recently touched or placed a cursor. The user may identify the element using the identify element button 548. This button 548 enables a user to create a name, such as a variable name, for the element. Address 542 is one such name. The user may wish to delete a highlighted template element using the delete element button 550.

Once the user has added, identified and/or deleted all elements, the user may save the resulting template using the save button 552 or cancel the process using the cancel button 554. Saving the template may store it to local MFP memory, to a remote server location or may enable a user to transmit the template to a client computer or mobile device for subsequent use. The cancel button 554 enables a user to end the process. The display 515 is merely exemplary and the layout, individual elements and the overall appearance may take on many forms.

The resulting template may be generated, for example, in extensible markup language (XML) and appear in a manner similar to the following:

```
<?xml version="1.0" encoding="ISO-8859-1"?>
<xsl:stylesheet version="1.0" xmlns:xsl="http://www.w3.org/1999/XSL/Transform">
<xsl:template match="/">
<html>
<head>
    <title>Untitled Page</title>
    <style type="text/css">
p.MsoNormal
    {margin-bottom:.0001pt;
```

-continued

```
    font-size:12.0pt;
    font-family:"Times New Roman","serif";
    margin-left: 0in;
margin-right: 0in;
margin-top: 0in;
    }
.shape {behavior:url(#default#VML);}
    </style>
</head>
<body>
    <p class="MsoNormal">
    <xsl:value-of select="Patients/Patient/date" /></p>
    <p class="MsoNormal"> </p>
    <p class="MsoNormal">
    <xsl:value-of select="Patients/Patient/address" /></p>
<p class="MsoNormal">
    <span >Dear Ms. <xsl:value-of select="Patients/Patient/lastName"/>:
</p><p class="MsoNormal">
        </p>
<p class="MsoNormal">
    I am writing to remind you to <b>call today</b> for an appointment
to get your xRay exam.</p>
<p class="MsoNormal">
    We look forward to seeing you soon!</p>
<p class="MsoNormal">
    <span > <span ></p>
<p class="MsoNormal">
    Sincerely,</p>
<p class="MsoNormal">
    <span > <span ></p>
<p class="MsoNormal"><xsl:value-of select="Patients/Patient/
doctorName"/><span></p>
</body>
</html>
</xsl:template>
</xsl:stylesheet>
```

The XML file will be used to create a plurality of files when rendered using data from a data source in place of the template elements identified by a user. Access to one or more data sources used to complete the template may be enabled by a server operating as a connector or gateway controlling and enabling access to the data source. The above XML file will create a form letter including the template elements identified by brackets, the form letter taking the following form:

```
[date]
[address]
Dear Ms. [lastName]:
I am writing to remind you to call today for an appointment to get
your xRay exam.
We look forward to seeing you soon!
Sincerely,
[doctorName]
```

The form letter may be used by an MFP in conjunction with a data source to prepare letters for printing or for sending to relevant individuals via facsimile or email.

Description of Processes

Figure 6:
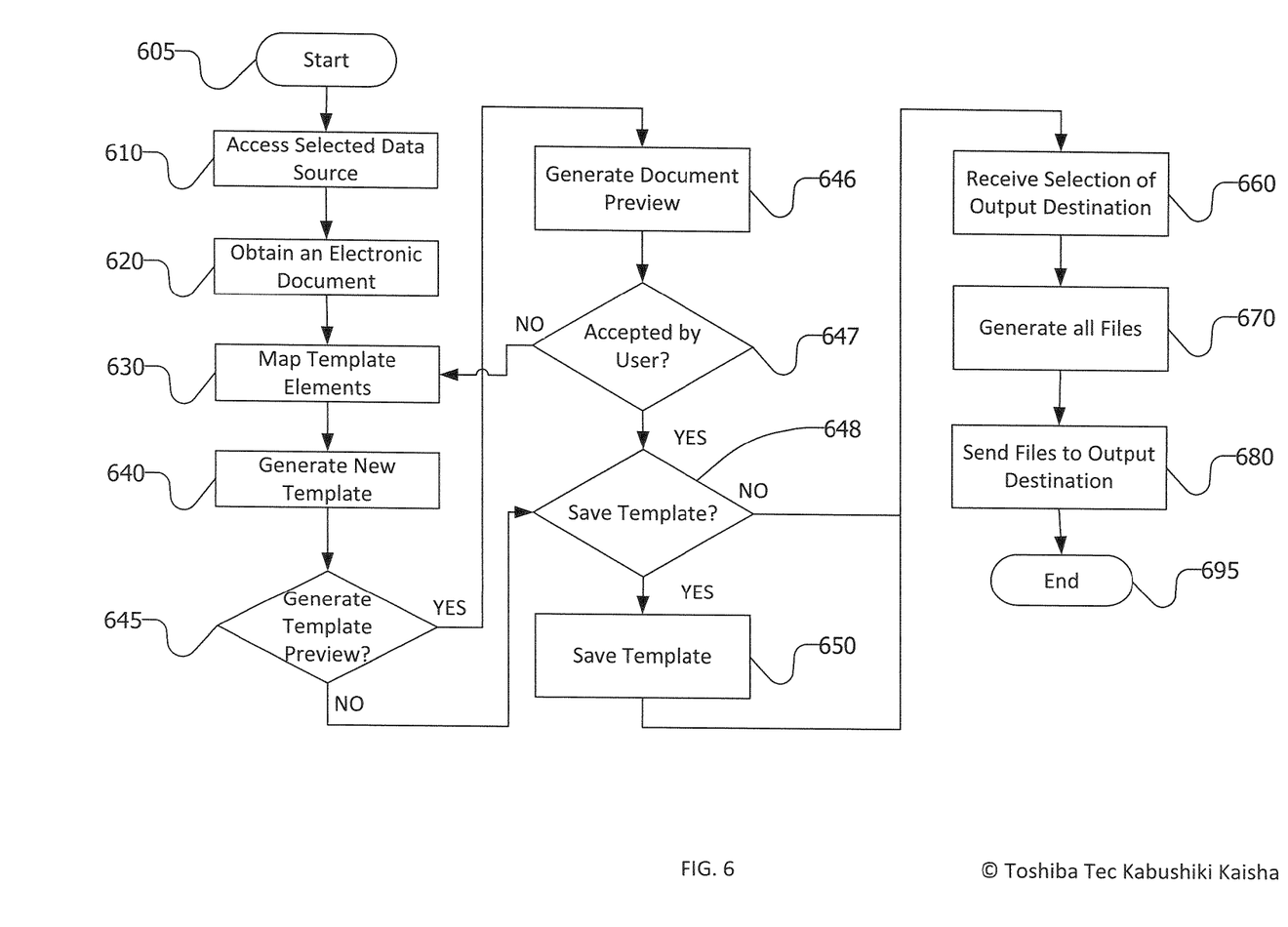
FIG. 6 is a flowchart of automated file generation using a multifunction peripheral device is shown.

Referring now to FIG. 6, a flowchart of automated file generation using a multifunction peripheral device is shown. The process begins at 605 and ends at 695, but may be repeated multiple times and portions of the process may be repeated in order to complete the process in a way desired by a user of the system.

After the process starts at 605, the MFP may then accept interaction from a user selecting a data source from which to draw the data used to replace the template elements in the resulting files that are generated. The user may select a data source stored locally on the MFP or may select a data source on a shared network drive, a cloud storage solution, an email or Exchange® server or on a mobile device in data communication with the MFP. In order to incorporate the data from the data source into the template, the MFP must first access the selected data source at 610. This process may involve the initiation of data communication with the selected data source via a connector or intermediary server that enables access to the data source.

Next, an electronic document is obtained at 620. This electronic document will form the basis of the template. This process may require an individual to use the MFP to scan a physical document at the MFP. The MFP may then perform optical character recognition on the physical document to thereby identify text within the document and thereby create an electronic document. This physical document may be a paper-based document of one or more pages. Alternatively, this process may involve obtaining an electronic document from a source other than a physical document. These sources may include data repositories, databases, websites, cloud storage systems, email servers, or from (or through) a mobile device in communication with the MFP.

The electronic document including the template elements may then be mapped at 630. This process involves user interaction with a user interface that may include a touchscreen display. The user identifies one or more template elements within the electronic document and one or more data elements from which each template element will draw data. The example display shown in FIG. 5 shows a template element of address 542 being associated with the highlighted portion of text 544. The highlighted portion of text 544 becomes the variable template element 542 in the resulting template.

A plurality of template elements may exist in a given template. These are all mapped to a location within the non-template element text to thereby generate a new template at 640. This mapping will involve identifying both the location within the electronic document to be replaced with template data and the source (for example, a database table) in the data source from which the data will be drawn. The template may be, for example, an XML document including the non-template element text and template elements, such as template element 542, suitable for use with a data source.

The MFP may then present an option to a user to generate a template preview at 645. This option may enable the MFP user to view the results of the newly-created template using sample data obtained from the data source. If the user does not wish to view a template preview, he or she may decline to generate a preview at 645.

If the user requests a preview be generated at 645, then the MFP generates the document preview at 646. This may involve making a connection to the data source, for example, using a network accessible to the MFP and, potentially, a connector acting as an intermediary server granting access to the data source, and obtaining at least one set of data from the data source sufficient to generate one example file that is the result of the template and data source combination.

The user may then accept or reject the results of the generated document preview at 647. If the generated preview is not accepted, for example, the user mapped the data incorrectly or incorrectly identified the locations in the electronic document to which data from the data source should be mapped, then the MFP provides the opportunity to map the template elements again at 630.

If the preview is accepted by the user at 647, then the MFP presents the option for the user to save the template for later use at 648. This template may be saved in the same location as the data source, locally on the MFP or may be stored on a network, cloud-based, database or other remote location.

Alternatively, the template may be stored on a user's mobile device or emailed to a user. If the user wishes to save the template, then it is saved at 650. If the user does not wish to save the template, then the process continues.

The MFP then seeks interaction from a user regarding the output destination for the resulting files that are generated using the template and the data source. The output destination may be an email address, a series of email addresses (for example, email addresses drawn from the data source itself), a network storage, a cloud-based storage system, local storage on the MFP, an Internet address or any number of other locations.

Once that output destination selection is received at 660, then the files using the template and the data source are generated at 670. The resulting files are generated automatically using the template and the data source. The generation process may continue until the data source is exhausted or until interrupted by a user. In some cases, the generation process may continue as a background process during down cycles for the MFP such that normal operation of the MFP, once the file generation process is begun, is not interrupted for other users. In this way, for large data sources, the file generation process can utilize otherwise non-useful processing cycles of an MFP that is rarely fully-utilized.

Finally, the resulting files are sent to the selected output destination. This sending may require the interaction of a connector acting as an intermediary server to grant access to or to prepare the files for transmission to (in the example of email transmission of files) the output destination.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A multifunction peripheral comprising:
   a network interface for accessing a data source including data to be inserted into a plurality of files generated using a template and the data source;
   a user interface including a display device integral to the multifunction peripheral for receiving user input identifying template elements that act as location placeholders within an electronic document for data from the data source;
   a controller for generating the template from the electronic document using the identified template elements;
   the controller further for generating a preview of a file generated using the template and the data source, the preview visible on the display device;
   the user interface further for receiving selection of an output destination for the plurality of files generated using the template and the data source;
   the controller further for generating the plurality of files using the template and the data source; and
   the network interface further for sending the plurality of files to the output destination.

2. The multifunction peripheral of claim 1 wherein the network interface is further for saving the template for later use after generating the template.

3. The multifunction peripheral of claim 1 wherein the user interface for receiving user input identifying the template elements includes the capability to accept user interaction with the display through a touchscreen to thereby identify specific keywords in the electronic document that are the template elements.

4. The multifunction peripheral of claim 1 wherein the data source includes one of (1) a plurality of XML files containing the data and (2) a database containing the data.

5. The multifunction peripheral of claim 1 wherein the output destination is selected from the group comprising: (1) a plurality of email addresses, (2) a cloud-based storage location, and (3) a workgroup shared storage location.

6. The multifunction peripheral of claim 5 wherein each of the plurality of email addresses is drawn for each of the plurality of files from the data source.

7. The multifunction peripheral of claim 1 further including a scanner for scanning a physical document, the physical document including the template elements, to thereby generate the electronic document.

8. A method of generating a file using a multifunction peripheral device, the method comprising:
   accessing a data source including data to be inserted into a plurality of files generated using a template and a data source;
   receiving user input identifying template elements that act as location placeholders within an electronic document for data from the data source;
   generating the template from the electronic document using the identified template elements;
   generating a preview of a file generated using the template and the data source, the preview visible on the display device;
   receiving selection of an output destination for the plurality of files generated using the template and the data source;
   generating the plurality of files using the template and the data source; and
   sending the plurality of files to the output destination.

9. The method of claim 8 further comprising saving the template for later use after generating the template.

10. The method of claim 8 wherein the receiving user input identifying the template elements includes user interaction with the display through a touchscreen to thereby identify specific keywords in the electronic document that are the template elements.

11. The method of claim 8 wherein the data source includes one of (1) a plurality of XML files containing the data and (2) a database containing the data.

12. The method of claim 8 wherein the output destination is selected from the group comprising: (1) a plurality of email addresses, (2) a cloud-based storage location, and (3) a workgroup shared storage location.

13. The method of claim 12 wherein each of the plurality of email addresses is drawn for each of the plurality of files from the data source.

14. The method of claim 8 further comprising scanning a physical document, the physical document including the template elements, to thereby generate the electronic document.

15. Apparatus comprising a storage medium storing a program having instructions which when executed by a processor will cause the processor to:
   access a selected data source including data to be inserted into a plurality of files generated using a template and a data source;
   receive user input identifying template elements that act as location placeholders within an electronic document for data from the data source;
   generate a template from the electronic document using the identified template elements;
   generate a preview of a file generated using the template and the data source, the preview visible on the display device;
   receive selection of an output destination for the plurality of files generated using the template and the data source;
   generate the plurality of files using the template and the data source; and
   send the plurality of files to the output destination.

16. The apparatus of claim 15 wherein in the instructions will further cause the processor to save the template for later use after generating the template.

17. The apparatus of claim 15 wherein in the instructions will further cause the processor to receive user input identifying the template elements includes user interaction with the display through a touchscreen to thereby identify specific keywords in the electronic document that are the template elements.

18. The apparatus of claim 15 wherein the data source includes one of (1) a plurality of XML files containing the data and (2) a database containing the data.

19. The apparatus of claim 15 wherein the output destination is selected from the group comprising: (1) a plurality of email addresses, (2) a cloud-based storage location, and (3) a workgroup shared storage location.

20. The apparatus of claim 19 wherein each of the plurality of email addresses is drawn for each of the plurality of files from the data source.

21. The apparatus of claim 15 wherein the instructions will further cause the processor to scan the physical document, the physical document including the template elements, to thereby generate the electronic document.

22. The apparatus of claim 15 further comprising:
   a processor
   a memory
   wherein the processor and the memory comprise circuits and software for performing the instructions on the storage medium.

\* \* \* \* \*